US006920185B2

(12) United States Patent
Hinson

(10) Patent No.: US 6,920,185 B2
(45) Date of Patent: Jul. 19, 2005

(54) DISTRIBUTED BLOCK FREQUENCY CONVERTER

(75) Inventor: Scott R. Hinson, Austin, TX (US)

(73) Assignee: Advent Networks, Inc, Austin, TX (US)

(*) Notice: Subject to any disclaimer, the term of this patent is extended or adjusted under 35 U.S.C. 154(b) by 88 days.

(21) Appl. No.: 09/911,001

(22) Filed: Jul. 23, 2001

(65) Prior Publication Data

US 2003/0016701 A1 Jan. 23, 2003

(51) Int. Cl.[7] .............................................. H04L 27/04
(52) U.S. Cl. ........................ 375/295; 455/102; 455/313
(58) Field of Search ................................. 375/260, 267, 375/295, 299, 316, 130; 455/102, 130, 313; 370/480

(56) References Cited

U.S. PATENT DOCUMENTS 5,784,413 A * 7/1998 Chen ........................... 375/308

* cited by examiner

Primary Examiner—Temesghen Ghebretinsae
(74) Attorney, Agent, or Firm—Craig J. Yudell; Dillon & Yudell LLP

(57) ABSTRACT

A distributed block frequency converter that combines multiple channel signals into a combined radio frequency (RF) signal suitable for transport via selected media. The converter includes combiners that each combine at least two channel signals into a combined channel signal, an up-converter synthesizer that generates an up-converter local oscillator (LO) signal, up-converter mixers that each mix a combined channel signal with the up-converter LO signal to provide a corresponding intermediate frequency (IF) signal, bandpass filters that each filter an IF signal, down-converter synthesizers, down-converter mixers that each mix a down-converter LO signal with a corresponding filtered signal to provide a corresponding RF signal, and an RF combiner that combines the RF signals into a single RF signal. The down-converter synthesizers are adjustable to achieve frequency agility on a block by block basis.

30 Claims, 6 Drawing Sheets

DISTRIBUTED BLOCK FREQUENCY CONVERTER

CROSS-REFERENCE TO RELATED APPLICATION(S)

The present application is related to U.S. Application entitled "TIME DIVISION MULTIPLEXING OVER BROADBAND MODULATION METHOD AND APPARATUS", application Ser. No. 09/804,104 filed Mar. 12, 2001, which is hereby incorporated by reference in its entirety.

FIELD OF THE INVENTION

The present invention relates to channelized communication systems, and more particularly, to a distributed block frequency converter that combines and up-converts multiple channels for transport via selected media.

DESCRIPTION OF RELATED ART

Channelized communication systems often require that multiple channel signals or bands be combined into a common or single signal for transporting via a selected medium, such as the air (wireless) or a selected media, such as electrical or optical cables. In general, an up-conversion processes is performed to combine the signals at a higher frequency carrier signal or the like with sufficient bandwidth to carry the combined information of the multiple channels. A single process is possible in which each channel is up-converted using a local oscillator (LO) and a mixer, where the information is essentially shifted or frequency converted to either sideband of an LO signal. Each individual channel is then filtered and combined, such as using a radio frequency (RF) combiner or the like, to achieve the common RF transport signal.

In many channelized broadband communication architectures, however, it is desired or even essential to provide equipment with frequency agility so that the individual channels may be adjusted to accommodate any applicable frequency plan. Most applications, including those associated with the cable television industry, are bandwidth-limited in that the available frequency spectrum is not constant across the industry. Each cable operator may employ a different frequency plan so that frequencies available for one operator may not be available for another operator. Frequency agility enables each cable operator to adjust the cable equipment to communicate in available frequency ranges or channels for their particular frequency scheme.

To achieve frequency agility, many channelized communication systems employ a dual process of up-conversion and down-conversion on a per-channel basis prior to RF signal combining. Each channel is up-converted using a suitable LO or synthesizer that asserts a corresponding carrier signal to a mixer. The mixer combines the channel signal with the carrier signal to develop an appropriate intermediate frequency signal. A filter, such as a bandpass filter or the like, is used to isolate the desired signal and reduce or otherwise eliminate undesired frequencies and reflections generated by the mixer process. Another synthesizer and mixer pair is then used for each channel to perform a down-conversion process to a target radio frequency signal. The carrier signal of the down-converter synthesizer is often at a relatively high frequency so that the resulting output channel RF signal does not need further filtering. Also, the down-converter synthesizer is adjustable to obtain the desired frequency agility. The resulting multiple channel RF signals are then combined by an RF combiner or the like to develop the combined signal.

At least one problem with the typical dual up-conversion and down-conversion process is that two synthesizers are necessary for each channel. Each synthesizer consumes a substantial amount of both space and power. For example, an exemplary synthesizer circuit or chip may have a size on the order of one square inch and consume about one-fourth Watt of power. If a significant number of channels are necessary, the physical size and power requirements becomes relatively excessive due in large part to the synthesizer circuits alone. Circuit design techniques may be employed to achieve higher densities and somewhat lower power requirements. Nonetheless, such circuits are still subject to existing physical limits so that equipment designed to handle a significant number of channels is physically large and requires a substantial amount of power.

The present invention is illustrated in the broadband cable television environment. It is understood, however, that the present invention is not limited to the cable environment and is applicable to any channelized communication system. The demand for broadband content by business and residential subscribers is continually increasing. Broadband content includes multiple types of entertainment programming, communications and data, Internet access, packet telephony, etc. To meet the increasing demand, it is necessary to increase bandwidth to each subscriber and to improve quality of service. Current delivery technologies include several variations of DSL (digital subscriber line) technology, such as ADSL (asymmetrical DSL) and the like, which uses telephony technology, cable modem systems using television technology and HFC (hybrid fiber coax) distribution networks, 2-way wireless local loop (WLL), including 2-way satellite, etc. The existing legacy technology for providing broadband content is becoming increasingly inadequate to meet the demand.

Cable modem systems for the delivery of data services using Data-Over-Cable Service Interface Specifications (DOCSIS) utilize the television broadcast spectrum and television technology to broadcast so-called broadband data to subscribers. The television data delivery systems have been established to deliver data to subscribers over a television broadcast spectrum extending from approximately 15 Megahertz (MHz) to approximately 860 MHz. Delivery of analog television downstream to the subscriber occupies the spectrum between approximately 54 MHz to 550 MHz, which leaves a relatively small range of spectrum for the delivery of digital information over HFC cable modem systems. The diplex filter separating the downstream from the upstream is located within the frequency range of approximately 42 to 54 MHz in an extended sub-split frequency plan, which is common for most consumer-based HFC systems. Therefore, the two effective delivery frequency ranges using typical consumer-based HFC systems are those between approximately 15–42 MHz (upstream) and those between approximately 550–860 MHz (downstream).

DOCSIS is a standard that specifies a methodology for delivering data services over an HFC plant. DOCSIS defines a Cable Modem Termination System (CMTS), which is an entity used to deliver data services over an HFC network from a central distribution point. DOCSIS systems use a shared frequency channel to broadcast all data to every downstream subscriber. The shared channel is generally 6 MHz wide providing a total data bandwidth of approximately 27–38 megabits per second (Mbps) for digital information. The channel, however, is shared among many subscribers, so that the data rate varies dramatically depending upon the time of use and the number of subscribers simultaneously logged on. The quality of service is particularly low during popular usage time periods. The upstream shared channel is usually smaller, such as 3.2 MHz or less, and a "poll and grant" system is employed to identify data for upstream transmission. The resulting upstream performance is often no better (and sometimes less) than a standard 56 Kbps modem.

The related application describes a new time division multiplexing over broadband modulation method and apparatus that enables the delivery of allocated, unshared and deterministic bandwidth to subscribers in a network. In one configuration, each cable channel is further channelized into 5 Mbps subchannels and multiplexed into a corresponding 40 Mbps signal to be distributed via a selected and available 6 MHz cable channel. Multiple cable channels are employed to provide a substantial amount of bandwidth to a significant number of subscribers in an HFC architecture. Equipment designed to deploy this new technology must be capable of handling a significant number of channels to be transmitted via common fiber and coaxial cables.

It is desired to reduce the physical size and power requirements of the circuitry used to implement a channelized communication system that requires the transport and delivery of a substantial number of individual data streams via corresponding channels.

SUMMARY OF THE INVENTION

A distributed block frequency converter according to an embodiment of the present invention combines multiple channel signals into a controlled radio frequency (RF) signal. The combined RF signal is suitable for transporting the combined signals via any suitable medium or media. In an HFC cable-based system, for example, the media includes coaxial and fiber optic cables. The up-converter includes combiners, an up-converter synthesizer that generates an up-converter local oscillator (LO) signal, up-converter mixers, bandpass filters, down-converter synthesizers, down-converter mixers and an RF combiner. Each combiner combines at least two channel signals into a combined channel signal. Each up-converter mixer mixes a combined channel signal with the up-converter LO signal to provide a corresponding intermediate frequency (IF) signal. Each bandpass filter operates as an image reject filter or the like to filter a corresponding IF signal in order to isolate the frequency range of interest of the IF signal and to reject other nearby artifacts of the mixer. Each down-converter synthesizer generates a down-converter LO signal to be used by a corresponding down-converter mixers In particular, each down-converter mixer mixes a down-converter LO signal with a corresponding filtered signal to provide a corresponding RF signal. Finally, the RF combiner combines the RF signals into a single RF signal suitable for transport. The down-converter LO signals are separated in frequency to reduce or otherwise eliminate interference between the resulting RF signals. In one embodiment employing blocks of four 6 MHz channels, a frequency separation of 50 MHz is used.

It is appreciated that the present invention enables a significant reduction in the number of up-converter synthesizers necessary at the front end of the converter since each synthesizer is used to up-convert a block of channel signals. A single up-converter LO signal may be used by all of the up-converter mixers, or a separate up-converter synthesizer is provided for each up-converter mixer. In either case, the number of up-converter synthesizers is reduced to less than one per channel. In a similar manner, the number of down-converter synthesizers is reduced to less than one per channel. The down-converter LO signals may be separated at least by a predetermined frequency value to reduce interference between the RF signals. To achieve frequency agility, however, the down-converter synthesizers may be adjustable, such as by using tunable oscillators or the like, so that each RF signal may be positioned to an available frequency range within the overall frequency spectrum.

In one embodiment, the channel signals are modulated by an appropriate modulator, such as according to quadrature amplitude modulation (QAM) or Frequency Shift Keying (FSK) or Quadrature Phase-Shift Keying (QPSK) or the like. Modulation and signal combining may be performed using digital signals, where the combined digital signals are converted to analog format prior to mixing. The channel signals provided to each combiner are separated in frequency to avoid interference with each other. Each combiner, however, may advantageously use the same or similar frequency levels or values so that the combined channel signals are each centered at approximately the same frequency level and may further have approximately the same frequency width prior to up-conversion. In this configuration, the use of the same up-converter LO signal results in each IF signal having approximately the same center frequency and range. In this manner, the bandpass filter arrangement is simplified since each filter is substantially identical. In a particular embodiment, for example, the IF signals may be centered at a convenient frequency level, such as a predetermined global system for mobile communications (GSM) frequency within the 900 MHz frequency range, such as any selected GSM frequency between 800–1000 MHz. In this manner, readily available off-the-shelf GSM bandpass filters may be used. In one particularly efficient configuration, each combiner combines four 6 MHz channels into combined channel signals and IF signals with a bandwidth of 24 MHz, and the up-converter mixers center the IF signals at the same center point of the GSM filters, where each GSM filter has a conventional bandwidth of approximately 25 MHz.

It is noted that each combiner may operate with the same number of channels. For example, in an illustrated embodiment, two combiners combine four channels each for a total of eight channels. It is appreciated that the number of channels per combiner and the number of combiners may be modified so that many different configurations are possible to handle any appropriate number of channels depending upon the particular application. Hybrid embodiments are also contemplated in which some channels are processed independently while other channels are combined for the up and down dual conversion process. Also, each of any number of combiners may combine different numbers of channels so that the channel block sizes may vary within the same converter. The variable-sized block RF signals are combined in a similar manner to achieve a single RF signal for transport.

A method of block combining multiple channel signals into a combined RF signal for transport includes combining each of multiple subsets of channel signals into corresponding combined channel signals, mixing the combined channel signals with an up-converter LO signal to provide corresponding intermediate frequency (IF) signals, bandpass filtering the IF signals into filtered signals, generating down-converter LO signals separated from each other in frequency, mixing each of the down-converter LO signals with a corresponding filtered signal to provide corresponding RF signals, and combining RF signals into a single combined RF signal suitable for transport on a selected media.

The method may further include generating multiple up-converter LO signals, so that each combined channel signal is mixed with a corresponding up-converter LO signal. The method may further include separating each channel signal of each subset of channel signals in frequency by a predetermined frequency value. The combining of subsets may include centering each combined channel signals at approximately the same frequency value. The method may further include adjusting the frequency of each down-converter LO signal to locate each of the RF signals within an available frequency range. The adjusting may include adjusting the frequency of each down-converter LO signal to reduce interference between the resultant RF signals. The method may further include modulating each of the plurality of channel signals prior to combining.

It is appreciated that block conversion of multiple channels in a channelized communication system enables a substantial reduction in the number of synthesizers used in the converter circuitry. A reduced number of synthesizers results in a significant reduction in the physical size and power requirements of the converter circuitry, thereby achieving a more efficient design of the communication system equipment.

BRIEF DESCRIPTION OF THE DRAWINGS

For a more complete understanding of the present invention, reference is now made to the following description taken in conjunction with the accompanying drawings in which like reference numerals indicate like features and wherein.

DETAILED DESCRIPTION OF EMBODIMENTS OF THE INVENTION

Figure 1:
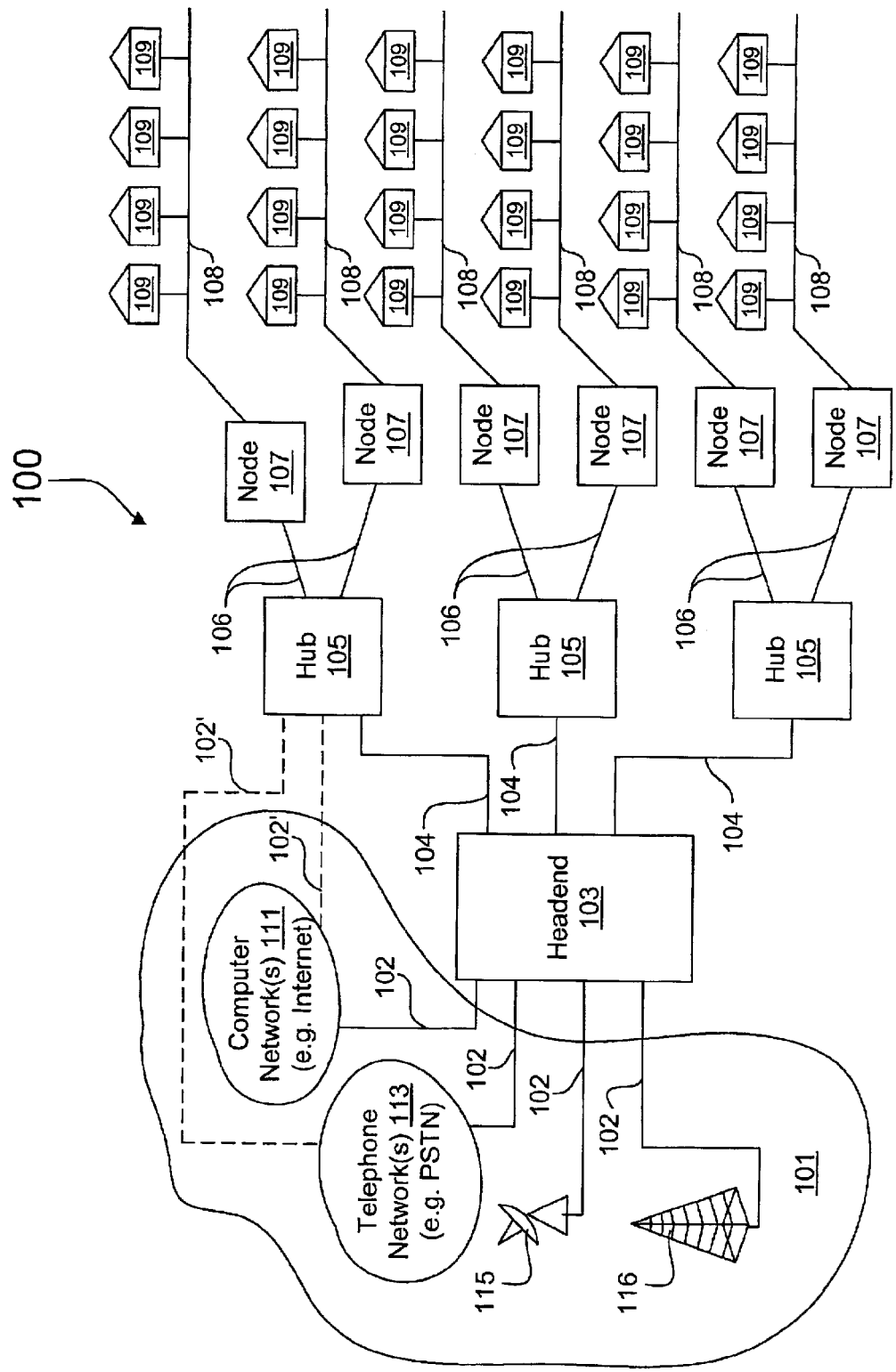
FIG. 1 is a block diagram of a communication network architecture according to an exemplary embodiment of the present invention.

FIG. 1 is a block diagram of an exemplary communication system 100 with an exemplary network architecture used to illustrate principles of the present invention. One or more sources 101 are coupled via appropriate communication links 102 to deliver source information to a headend 103, which distributes the source information to one or more distribution hubs 105 via respective communication links 104. Each distribution hub 105 further distributes source information to one or more nodes 107 via communication links 106, where each node 107 in turn distributes the source information to one or more subscriber locations 109 via subscriber links 108. In the embodiment shown, bi-directional communication is supported in which upstream subscriber information from any one or more of the subscriber locations 109 is delivered to the corresponding distribution hub 105 via the corresponding subscriber links 108. Depending upon the nature of the subscriber information and the network architecture, the subscriber information may be delivered to the headend 103, or to an appropriate source 101, by the corresponding distribution hub 105. Again, depending upon the nature of the subscriber information and the network architecture, the subscriber information may be further delivered to an appropriate source 101 by the headend 103.

It is noted that the headend 103, the distribution hubs 105, and the nodes 107, may generically be referred to as points of distribution for source and subscriber information. Each point of distribution supports a successively smaller geographic area from source 101 to subscriber 109. The headend 103, for example, may support a relatively large geographic area, such as an entire metropolitan area or the like, which is further divided into smaller areas, each supported by a distribution hub 105. The areas supported by each distribution hub 105 is further divided into smaller areas, such as neighborhoods within the metropolitan area, each supported by a corresponding node 107.

Many different types of sources 101 are contemplated, such as one or more computer or data networks 111, one or more telephony networks 113, one or more satellite communication systems 115, one or more off-air antenna systems 116 (e.g. microwave tower), etc. The computer networks 111 may include any type of local, wide area or global computer networks, both public and private, such as including the Internet or the like. The telephony networks 113 may include the public switched telephone network (PSTN) or other public or private telephony networks. The satellite communication systems 115 and/or the antenna systems 116 may be employed for reception and delivery of any type of information, such as television broadcast content or the like. The headend 103 may also include Video on Demand (VoD) equipment (not shown). Depending upon the network architecture, any one or more of the sources 101 may be coupled directly to one or more of the distribution hubs 105, in the alternative, or in addition to being coupled to headend 103, by communication links 102'. For example, one or more of the computer networks 111 and the telephony networks 113 are shown coupled to a distribution hub 105 in addition or in the alternative. The headend 103 includes appropriate equipment for data transmission, such as, for example, internal servers, firewalls, IP routers, signal combiners, channel re-mappers, etc.

Each of the communication links (102, 102', 104, 106, 108) may be implemented using any appropriate media, such as electrical or fiber optic cables or wireless or the like, or any combination of media, such as electrical and optical media and wireless or multiple optical media, etc. For example, in one embodiment, each of the communication links 102 and 102' includes optical media for communicating analog information, such as between the headend 103 and a satellite communication system 115 or an antenna system 116, and/or 1000Base-X Ethernet for communicating digital information between the headend 103 and any computer or telephony network 111, 113. Also, the communication links 106 comprise optical fibers or cables that are distributed between each node 107 and a corresponding distribution hub 105. The network architecture may employ a hybrid fiber coax (HFC) distribution network in which the subscriber links 108 comprises coaxial cables that are distributed from each node 107 to the respective subscriber locations 109. In this configuration, the nodes 107 are optical nodes for conversion between optical and electrical formats. The communication links 104 may also comprise optical links, such as, for example, SONET (Synchronous Optical Network) links or the like. It is understood that any known or future developed media is contemplated for each communication link. In an HFC embodiment, for example, each node 107 receives an optical signal from an upstream point of distribution, converts the optical signal to an electrical signal and distributes the combined electrical signal over a coaxial cable to each of the several subscriber locations 109 of a corresponding geographic serving area. Subscriber information is delivered to each node 107 as an electrical signal, which the node 107 converts into an optical signal, and delivers that optical signal upstream to the corresponding distribution hubs 105 via the corresponding communication links 106.

Each subscriber location 109 includes customer premises equipment (CPE), which further includes a subscriber gateway or the like (not shown), that separates upstream and downstream information, tunes, de-modulates, decodes and selects source information addressed or otherwise intended for the particular subscriber location 109. The subscriber gateway may be incorporated within, or otherwise coupled to other subscriber devices, such as set-top boxes, cable modems, etc. The gateway at each subscriber location 109 includes a modulating device, or the like, that encodes, modulates and up-converts subscriber information into RF signals. The gateway at each of the subscriber locations 109 combines the upstream RF signals onto the subscriber link 108 and delivers them to a corresponding node 107. A separate channel of the portion of the cable spectrum used for upstream communications may be assigned to each of the subscriber locations 109 to prevent interference with downstream communications. The upstream RF signals are delivered to the node 107, which includes an upstream optical transceiver or the like that converts the subscriber RF signals to an optical signal. For example, laser in the node 107 may be used to convert the return signal to an optical signal and send the optical return signal to an optical receiver at the distribution hub 105 over another fiber optic cable.

The source and subscriber information may include any combination of video, audio or other data signals and the like, which may be in any of many different formats. The source information may originate as fixed- or variable-size frames, packets or cells, such as Internet Protocol (IP) packets, Ethernet frames. Asynchronous Transfer Mode (ATM) cells, etc., as provided to the distribution hubs 105. Any such type of digital information in fixed- or variable-sized frames, packets or cells for both up and downstream data is referred to herein as "packetized" data. The packetized data includes one or more destination addresses or the like indicating any one or more specific subscriber devices at the subscriber locations 109 or other locations in the communication system 100. The gateway at each subscriber location 109 includes the appropriate communication equipment to tune, demodulate and decode the received information to deliver the original content to one or more subscriber devices. Upstream subscriber packetized data is converted to frames or codewords in a similar manner.

It is noted that many different modulating frequencies and techniques are contemplated for both downstream and upstream communications. Modulation techniques may include, for example, Frequency Shift Keying (FSK), Quadrature Phase-Shift Keying (QPSK), as well various types of Quadrature Amplitude Modulation (QAM), such as QAM 16, QAM 64, QAM 256, etc., among other modulation techniques. Also, each frequency or "physical" channel may have any predetermined bandwidth, such as 1 MHz, 3 MHz, 6 MHz, 12 MHz, etc., or slight variations thereof Each subscriber channel typically includes a separate downstream and upstream channel separated in frequency, where the corresponding downstream and up stream channels may have the same or different frequency band width. Further, the modulation technique employed for each downstream channel may be similar or substantially different than the modulation technique employed for each upstream channel.

In one embodiment, the communication system 100 is an HFC system that supports analog television broadcast transmission in which broadcast television channels are allocated to a particular frequency range of the overall available RF cable television spectrum (54 MHz–550 MHz). The remaining portion of the RF cable television spectrum is utilized to assign data channels including any combination of downstream and upstream channels. For example, some HFC systems implement an extended sub-split frequency plan with a return band, which extends from 5 to 42 MHz, and a forward band, which extends from 54 to 750–860 MHz. It is understood that the particular frequency ranges described herein are exemplary only and that any frequency allocation scheme may be employed depending upon the desired configuration. In one exemplary embodiment, the entire forward band is segmented into 6 MHz channels according to the channelization plan implemented by the particular HFC network operator. For typical HFC plants supporting analog television broadcasts, 80 analog channels are transmitted in the forward band between 54 and 550 MHz. In such HFC networks, satellite signals and local analog stations are mapped to 6 MHz broadcast channels within the forward band at the headend 103. Each 6 MHz forward band channel may contain an analog channel or one or more digital channels that are MPEG encoded. The return band (5–42 MHz) and the remaining forward band spectrum, including frequency ranges 550 to 750–860 MHz, is allocated to subscriber digital channels and/or data transmission for dedicated bandwidth to each subscriber location 109. For example, the frequency range 550 to 860 MHz is allocated for downstream channels and the frequency range 5 to 42 MHz is allocated for upstream channels. The frequency range 42–54 MHz is the location of a diplex filter that separates the downstream communications from the upstream communications. Diplex filters allow for bi-directional communication over the shared HFC fiber and coaxial medium. The basic diplex filter consists of a high pass and a low pass filter in parallel followed by an amplifier that are both driven from the same source.

In alternative embodiments of the communication system 100, such as in an all-digital HFC system, a substantial portion or the entire available spectrum is utilized to assign channels to each of the subscribers. In an all-digital HFC network, for example, there is no channel-on-channel carry requirement of matching analog channel frequency assignments to off-air frequencies (i.e. broadcasting cable channel 2 at 54 MHz over the HFC plant, in accordance with the HRC frequency plan). As a result, the filter frequency settings on the diplex filter may be adjusted upwards in an all-digital network from that of the extended sub-split frequency plan to increase spectrum available for upstream communications. For instance, mid-split and high-split frequency plans, which are suitable for an all-digital network, allocate the 5–86 MHz and 5–186 MHz ranges, respectively, for upstream transmission. Consequently, all-digital networks allow more upstream bandwidth for interactive services, such as data over cable services, packet telephony, video conferencing, interactive gaming, etc. In these all-digital embodiments, the relatively large bandwidth otherwise consumed by television broadcast information is available for channel assignments. This provides a significant advantage since a very "clean" portion of the RF spectrum (e.g., 50–300 MHz) may be employed for data communication. Each user may be allocated a greater amount of bandwidth or a greater number of subscribers may be served by each coaxial cable. A different frequency spectrum split may be utilized to increase upstream bandwidth availability, and to enable a more symmetrical configuration with more equal downstream and upstream bandwidth allotments. Embodiments with a smaller geographical serving area introduce less noise and need less amplification so that each subscriber location 109 receives a cleaner signal, increasing overall reliability and throughput.

Figure 2:
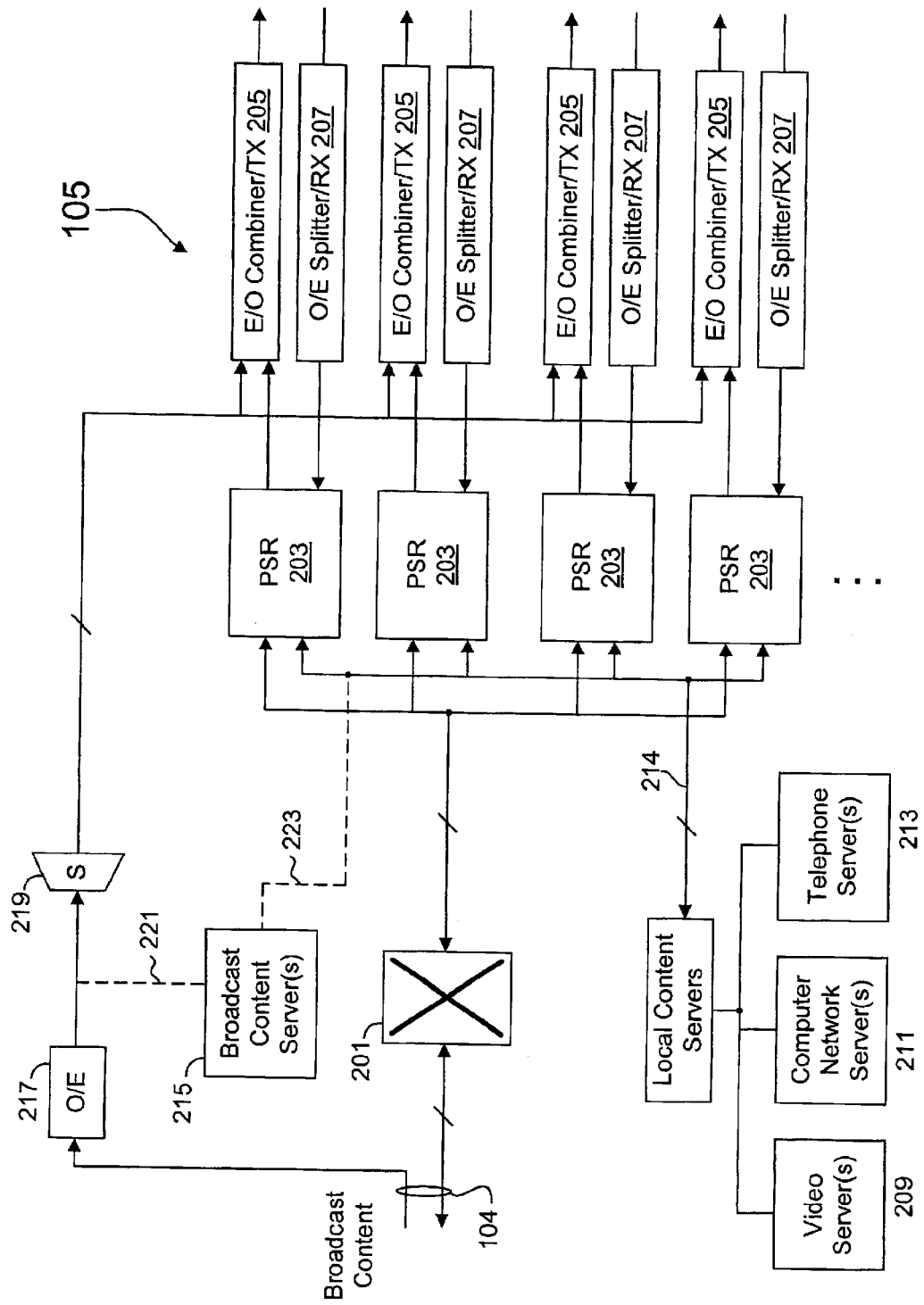
FIG. 2 is a simplified block diagram of an exemplary embodiment of the distribution hubs of FIG. 1.

FIG. 2 is a simplified block diagram of an exemplary embodiment of any one or more of the distribution hubs 105 of FIG. 1. In the embodiment shown, the distribution hub 105 includes a switch 201 that receives and forwards digital information, such as data and content, between the upstream sources via the communication link 104, such as the sources 101 and/or the headend 103, and one or more (N) packet switch routers (PSRs) 203. The switch 201 and each PSR 203 may be configured to communicate via optical media or the switch 201 may include, or be preceded by, an optical to electrical (O/E) conversion stage. In one embodiment, the switch 201 is an Ethernet switch that forwards Ethernet frames. Each packet includes source and destination addresses enabling the switch 201 to forward the packets from a source to the appropriate destination in both the upstream and downstream directions. In a more particular embodiment, the switch 201 includes one or more switches each operating according to 100Base-X or 1000Base-X Ethernet at a data rate of 100 megabits per second (Mbps) or 1 gigabit per second (Gbps), respectively. Each PSR 203 is interfaced with the switch 201 via separate and respective optical or electrical 100Base or 1000Base Ethernet electrical or optical links 214. It is understood that other network architectures, protocols and technologies may be used, such as Asynchronous Transfer Mode (ATM) technology or the like.

Each PSR 203 encodes, modulates and up-converts source digital information received from the switch 201 into one or more downstream channels, and forwards RF signals to respective inputs of at least one of one or more RF electrical to optical (E/O) combiners and transmitters 205. Each RF channel has a predetermined frequency bandwidth, which may differ between signals and over time (could be signaled), such as 6 MHz in a standard United States configuration, and thus supports a particular amount of data transmission depending upon the modulation technique employed. In a particular embodiment employing QAM-256 as the modulation technique, each 6 MHz physical channel has a data throughput capacity of approximately 40 Mbps. It is appreciated that modulation techniques other than QAM-256 may be employed. The PSR 203 may be implemented in a modular and scalable format to combine multiple downstream channels into at least one combined electrical signal distributed via a single RF connector. Also, each PSR 203 may be implemented to provide multiple combined electrical signals via corresponding RF connectors, each supporting multiple downstream channels. Each combiner/TX 205 combines the RF signals from one or more combined electrical signals from one or more PSRs 203 into a single combined optical signal that is transmitted via a fiber optic cable or the like to a corresponding one of the nodes 107. It is noted that each distribution hub 105 may transmit to one or more nodes 107, each serving a different geographic serving area.

Upstream subscriber digital information is received by a corresponding one of several RF optical to electrical (O/E) receivers and splitters 207, which receives an optical signal with combined subscriber information via an optical cable, converts the combined optical signal to a combined subscriber electrical signal and splits or duplicates and forwards the combined subscriber electrical signal to corresponding one or more of the PSRs 203. It is noted that the upstream signals are typically received over diverse return paths from separate nodes. In the embodiments described herein, the upstream signals are combined to a single signal that is received by a common PSR 203 input connector. Each PSR 203 is tuned to one or more upstream channels and extracts a corresponding return RF signal. Each PSR 203 demodulates and decodes the return RF signal into corresponding subscriber data packets for each upstream channel. The subscriber data packets are then forwarded to the switch 201 for processing and/or forwarding as necessary. It is noted that although a separate combiner/TX 205 and a separate splitter/RX 207 is shown for each PSR 203, multiple combiner/TXs 205 and splitter/RXs 207 may be provided for a single PSR 203 or multiple PSRs 203 may use a single combiner/TX 205 and/or a single splitter/RX 207 depending upon particular configurations and data capabilities of the respective devices.

The distribution hub 105 may include one or more local content servers that convert or otherwise deliver data and content between the distribution hub 105 and the subscriber locations 109 and/or upstream sources, such as the sources 101 and/or the headend 103. For example, the distribution hub 105 may include one or more video servers 209 that communicate video content, one or more computer network servers 211 that enable communication with the internet and/or other computer networks, and one or more telephone network servers 213 that enable communication with the PSTN and/or other telephonic networks. Also, the distribution hub 105 may include one or more broadcast content servers 215 for receiving and forwarding broadcast content and information, such as television broadcast channels or the like. Such broadcast content and information may be selectively delivered within individual subscriber channels or collectively broadcast with the subscriber channels as previously described. Each of the servers 209–215 represents one or more server computers and includes any additional functionality as necessary or desired. For example, the video servers 209 may incorporate one or more video functions including Video on Demand (VoD) and may further include a Moving Pictures Experts Group (MPEG) encoder or the like that encodes analog video content into digital video content or otherwise transcodes video content from one digital form to another. The telephony network servers 213 may include or otherwise incorporate one or more telephone switches or the like, or telephony gateways that converter telephony content formatted for one telephony network to a format suitable for another telephony network. The illustrated servers 209–215 are exemplary only and other types of servers and content are contemplated. Alternatively, the servers 209–215 may be replaced by a generic data server for exchanging information with the headend 103.

In one embodiment, broadcast content is received from an upstream source via the communication link 104 and provided to an O/E converter 217. The electrical broadcast content is then provided to a splitter 219 and distributed to respective inputs of one or more of the combiner/TXs 205.

The broadcast content may be in either analog or digital format. Each combiner/TX 205 is configured to receive and combine the broadcast television information with the source information forwarded within assigned channels from one or more of the PSRs 203. In particular, each combiner/TX 205 operates to overlay the broadcast content information, such as television broadcast channels or the like, with the digital subscriber channels to develop a combined optical signal for downstream transmission. The gateway at each of one or more of the subscriber locations 109 is configured to receive, split and forward the broadcast content information to an appropriate subscriber device, such as a set top box or television or the like. This embodiment of the communication system 100 is particularly applicable to consumer-based networks in which it is desired that cable television channels or the like be available directly from the subscriber medium routed to the subscriber locations 109 without the need for further conversion.

In an alternative embodiment, the electrical broadcast content is delivered to the broadcast content server 215 via alternative connection 221, where the broadcast content server 215 is linked to one or more of the PSRs 203 via switched connections through the switch 201, or directly, via dedicated connections 223 in a similar manner as the other local content servers 209–213. In this manner, the broadcast content and information is selectively delivered to subscriber locations 109 via corresponding subscriber channels. This embodiment of the communication system 100 conforms to the all-digital configuration in which the entire available spectrum is available for digital communications via the subscriber channels.

Figure 3:
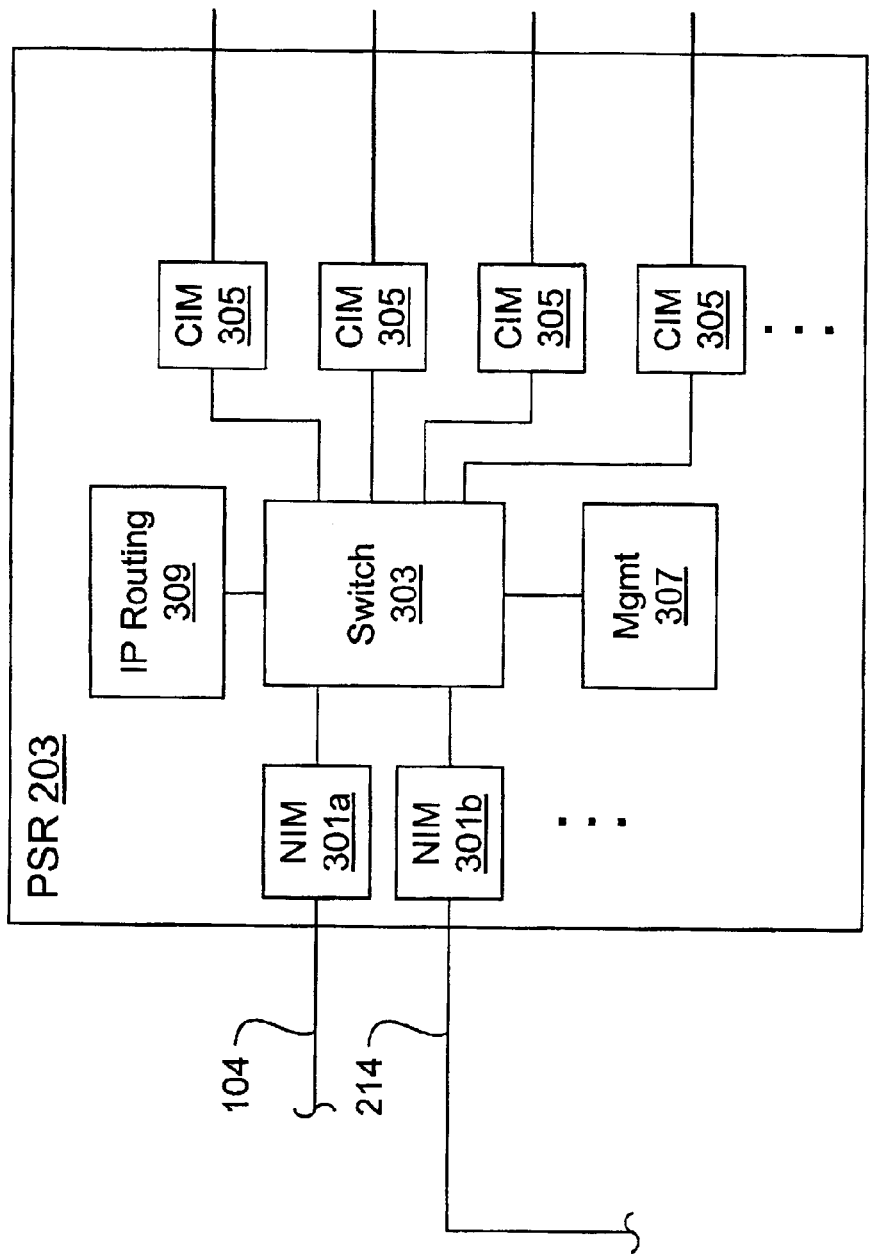
FIG. 3 is a functional block diagram of an exemplary embodiment of the packet switch routers of FIG. 2.

FIG. 3 is a functional block diagram of an exemplary PSR 203 implemented according to an embodiment of the present invention. The PSR 203 is deployed at a point of targeted service insertion, which is usually at one or more of the distribution hubs 105 in an HFC configuration. Targeted services are those services intended for a subset of the entire HFC network subscriber base, such as VOD services or the like. Targeted services are contrasted with broadcast services where a given signal that originates from an upstream source, such as the headend 103, to potentially serve all subscriber locations 109 within the general serving area of the communication system 100. Analog and digital audio and video services are examples of broadcast services.

The PSR 203 includes one or more Network Interface Modules (NIMs) 301, each configured to interface and terminate links of a particular network communication architecture (104, 214). Both the links (104, 214) and the NIMs 301 may be bi-directional, forwarding information to and from upstream sources. As shown, NIM 301a is coupled to the communication link 104 to enable communications with upstream sources, such as any of the sources 101 and/or the headend 103, etc., either directly or via the switch 201. The NIM 301a, for example, may include a physical interface, such as a 1000Base-X Ethernet transceiver, which converts fiber optic Ethernet signals into electrical signals on a standard Gigabit Media Independent Interface (GMII). In the Ethernet embodiment, the NIM 301a terminates the GMII with an IEEE 802.3 Gigabit Ethernet Media Access Control (MAC) entity, which assembles Ethernet frames from the electrical signals of the GMII. Another NIM 301b is provided to interface one or more of the local content servers 209–215 via the corresponding communication protocol, such as 100 or 1000Base-T Ethernet connections or links 214 previously described. The PSR 203 may be implemented in a scalable manner to allow additional NIMs 301, each configured to interface additional communications links (e.g., 104 and 214). In general, the NIMs 301 provide network interfaces to a high-speed local, metro or wide area networks (LANs, MANs, WANs, etc.)

Each NIM 301 includes a physical interface for network connectivity and may include integrated IP forwarding engines that forward traffic between a network interface port and a switch 303. The NIM functionality also includes physical encoding and link layer framing. The switch 303 is coupled to one or more Channel Interface Modules (CIMs) 305, where each CIM 305 interfaces a corresponding combiner/TX 205. The switch 303 forwards downstream information from the NIMs 301 to a selected one of the CIMs 305, and forwards upstream information from the CIMs 305 to one or more of the NIMs 301. For IP-based embodiments, each of the CIMs 305 adapts IP packets for synchronous downstream transmission and extracts IP packets from synchronous bit streams in the upstream direction. Each of the CIMs 305 forwards downstream data to at least one combiner/TX 205 and receives upstream data from at least one splitter/RX 205. For transmission in the downstream direction, each CIM 305 performs packet encapsulation, forwarding, broadband packet encapsulation, channelization, encoding, modulation and additional RF functions. For transmission in the upstream direction, each CIM 305 performs similar and inverse functions.

Each CIM 305 supports multiple downstream frequency channels combined and upconverted to a common carrier signal provided to a corresponding combiner/TX 205 via a single connector. In one embodiment, for example, the CIM 305 provides 8 QAM-256 modulated 6 MHz channels, where the corresponding combiner/TX 205 combines the outputs of one or more CIMs 305. In an exemplary embodiment of the communication system 100 that supports television broadcast content in the 54–550 MHz range, the output of each CIM 305 resides within the 550–750 MHz or 550–860 MHz range. The combined physical channels may or may not be contiguous depending on the RF combining and upconverting network implementation. In a particular example, if the QAM signals have carrier frequencies of 600, 606, 612, 618, 624, 630, 636, and 642 MHz, then the output of the CIM 305 occupies the 597–645 MHz spectrum. An adjacent CIM 305 may have carrier frequencies of 648, 654, 660, 666, 672, 678, 684, and 690 MHz occupying the 645–693 MHz spectrum. As a result, the corresponding combiner/TX 205 combines the 51–537 MHz broadcasts spectrum with the 597–645 MHz or 645–693 MHz output of one CIM 305 or the 597–693 MHz outputs of the two adjacent CIMs 305. The resulting RF signal is converted to an optical signal and transmitted to a corresponding node 107 by an optical transmitter. It is noted that since each PSR 203 provides a targeted service with spectrum that is only unique to a particular node 107 served by an optical transmitter corresponding to a PSR output, the same frequencies may be used for transmission across multiple outputs of each hub 105. Note that more than one physical node may be served by a CIM port by replicating the converted optical signal at an intermediate transport node.

The switch 303 and its interface to the NIMs 301 and CIMs 305 may be implemented in accordance with any one of many different configurations. In one exemplary embodiment, the switch 303 is implemented in accordance with the Common Switch Interface (CSIX) specification, such as CSIX-L0, CSIX-L1, CSIX-L2, etc. The switch 303 and each NIM 301 and CIM 305 communicate across a common bus or cross-bar switch (not shown) or the like using CFrames in accordance with the applicable CSIX specification.

The switch 303 executes IP routing algorithms and performs system management and control functions, either internally or via a separate IP routing block 309 and a separate management block 307. The switch 303 distributes routing tables to IP forwarding engines located on each NIM 301 and CIM 305 via the illustrated connections or through a separate control bus or serial link or the like. The switch 303 also incorporates a switch fabric that provides connectivity for traffic between the NIMs 301 and the CIMs 305. The switch 303 may include 10/100 Base-T Ethernet and asynchronous interfaces for management connectivity. In one embodiment, the switch 303 includes a high-speed, synchronous, bi-directional, serial crossbar switch that performs the centralized switching function in the PSR 203. The switch 303 includes a fabric controller that is responsible for scheduling and arbitration in the switch fabric architecture. The fabric controller manages the connections through the switching fabric using an appropriate scheduling algorithm that is designed to maximize the number of connections per switching cycle. Management functions may be handled within the switch 303 or by another management module 307 as illustrated. Each of the NIMs 301 and CIMs 305 may be coupled to the management module 307 via separate management connections (not shown).

Figure 4:
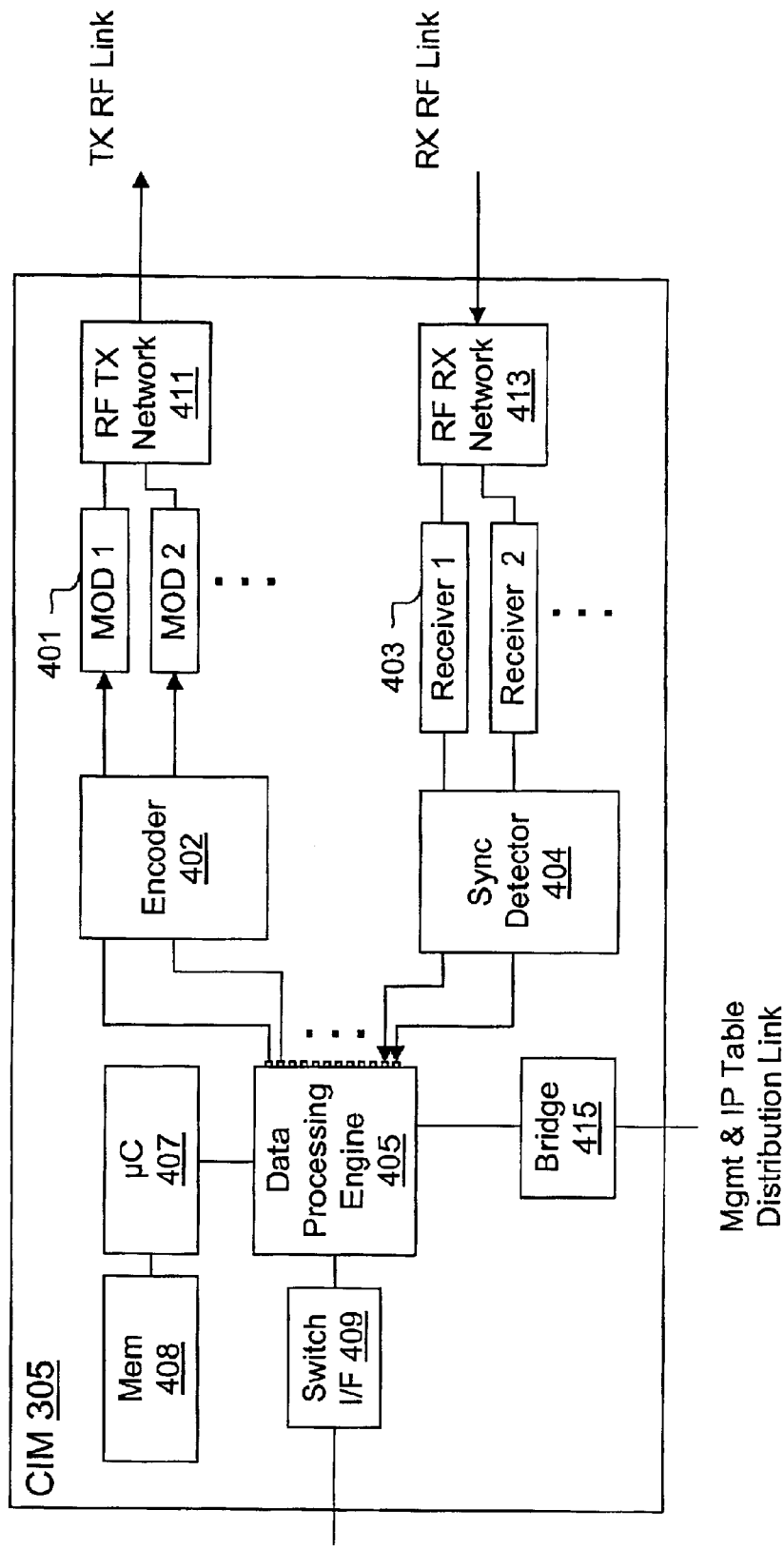
FIG. 4 is a functional block diagram of an exemplary embodiment of the channel interface modules of FIG. 3.

FIG. 4 is a functional block diagram of an exemplary embodiment of a CIM 305. In the embodiment shown, the CIM 305 forwards packets, such as IP packets or the like, and performs packet framing and channelization. In addition, the CIM 305 performs the associated digital and RF signal processing for transmission over the network architecture. Each CIM 305 includes a data processing engine 405 that interfaces the switch 303 via a switch interface 409. The data processing engine 405 may include supporting internal or external memory for table-lookups, queued data payload buffer descriptors and data payload buffer storage. Such memory may include any combination of read only memory (ROM) or random access memory (RAM) devices. The data processing engine 405 processes each packet transferred between the network interface via the splitter/RX 207 and the switch interface 409. The data processing engine 405 functionality includes forwarding, link layer framing and physical layer encoding for transmission to the combiner/TX 205 or to switch interface 409 for transmission to the switch 303. In addition, the data processing engine 405 performs physical and link layer framing.

The CIM 305 includes multiple modulators (MOD) 401 coupled to the data processing engine 405 via an encoder 402 to enable broadband modulated transmission of packetized data. The CIM 305 further includes multiple receivers 403 coupled to the data processing engine 405 via a synchronization detector 404. In one embodiment, the encoder 402 performs continuous-mode randomization, error encoding and interleaving on separate streams of data and the modulators 401 perform QAM-256 for data transmission of each stream. The outputs from the modulators 401 are combined in the frequency domain by an RF transmitter network 411, which provides a single combined, up-converted, amplified, and filtered output via a corresponding transmitter RF link. Such analog RF processing includes filtering, frequency combining and mixing. Likewise, the receivers 403 receive upstream information through a corresponding splitter/RX 207 via an RF receiver network 413. The RF receiver network 413 processes analog RF signals, where such processing includes frequency tuning, filtering and mixing. The receivers 403 perform similar and inverse functions of the modulators 401 and provide separate streams of un-modulated data to the synchronization detector 404. The synchronization detector 404 provides the separate upstream data streams to the data processing engine 405.

In the downstream direction, the data processing engine 405 forwards a packet from the switch interface 409 to the appropriate channel based on destination address. The data processing engine 405 performs data link layer encapsulation to encapsulate packets into frames. The data processing engine 405 adapts the frames for cell transport suited for encoding. In one exemplary embodiment, such encoding is according to the Reed-Solomon (RS) encoding procedure. The data processing engine 405 may also perform multiplexing operations to further sub-divide each physical downstream channel. The data processing engine 405 adapts packets for synchronous transmission and extracts packets from synchronous bit streams. Each subscriber channel is a bi-directional data link layer communications channel between the PSR 203 and the gateway of each subscriber location 109 served by the PSR 203.

For downstream packet processing, the CIM 305 performs a series of protocol functions upon the ingress frames, adapting packets into synchronous bit-streams for transmission over a corresponding channel. The general process illustrated is agnostic relative to the type of packets or frames, such as Ethernet frames, ATM cells, CSIX frames, etc. The data processing engine 405 performs packet decapsulation and/or re-assembly for each downstream frame, where particular processing depends upon the particular packet data format. The resulting packets are forwarded to an appropriate channel corresponding to the destination address indicated in an associated header. In one embodiment, the data processing engine 405 includes separate channel processing modules or blocks are for each channel. Alternatively, the data processing engine 405 separates the channels within its memory.

The digital data output from each of the modulators 401 are provided to the RF transmitter network 411 for RF processing and transmission. In particular, the RF transmitter network 411 maps the data into code words, converts the code words into a waveform, and modulates the waveform to an Intermediate Frequency (IF), such as between 30 MHz and 60 MHz. The IF signal is then upconverted to any one of several 6 MHz channels within the applicable frequency range (550–860 MHz for the consumer broadcast television embodiment) by an up-converter. In one embodiment, two stages of up-conversion are used to achieve desired signal-to-noise levels. The upconverted signal is amplified and equalized for transmission over the TX RF link. The RF transmitter network 411 performs RF aggregation and provides the ability to operate anywhere within the applicable downstream frequency range based on software configuration. The RF transmitter network 411 outputs an RF signal that incorporates the combined information from each of the modulators 401.

The RF receiver network 413 includes an Analog Front End (AFE), Analog-to-Digital Converters (ADCs), RF tuners, amplifiers, filters, mixers and at least one frequency converter (not shown) that tunes to a corresponding upstream frequency channel for detecting and resolving the incoming signal. The RF receiver network 413 selects RF channels in the applicable frequency range (5–42 MHz for the consumer broadcast television embodiment) used for upstream transmission. The RF receiver network 413 may be configured with the ability to operate anywhere within the applicable downstream frequency range based on software configuration. Each receiver 403 may be implemented in a standardized or off-the-shelf manner. Demodulation is according to any one of several different modulation schemes, such as QAM-16, QAM-64, QAM-256, or the like. The demodulated data is forwarded to the synchronization detector 404. The synchronization detector 404 includes buffers, such as first-in, first-out (FIFO) memory devices or the like, and appropriate interface circuitry for interfacing the data processing engine 405. The data processing engine 405 performs de-multiplexing and inverse data link layer decapsulation of resultant frames. The resulting packets are forwarded to the switch 303 via the switch interface 409.

The CIM 305 includes a general purpose processor or microcontroller (μC) 407 or the like, coupled to the data processing engine 405, for handling administrative tasks and further for initializing each gateway for both downstream and upstream communications. An optional memory 408 may be provided and coupled to the μC 407 for storing data, variables and parameters or the like for facilitating its various functions.

Figure 5:
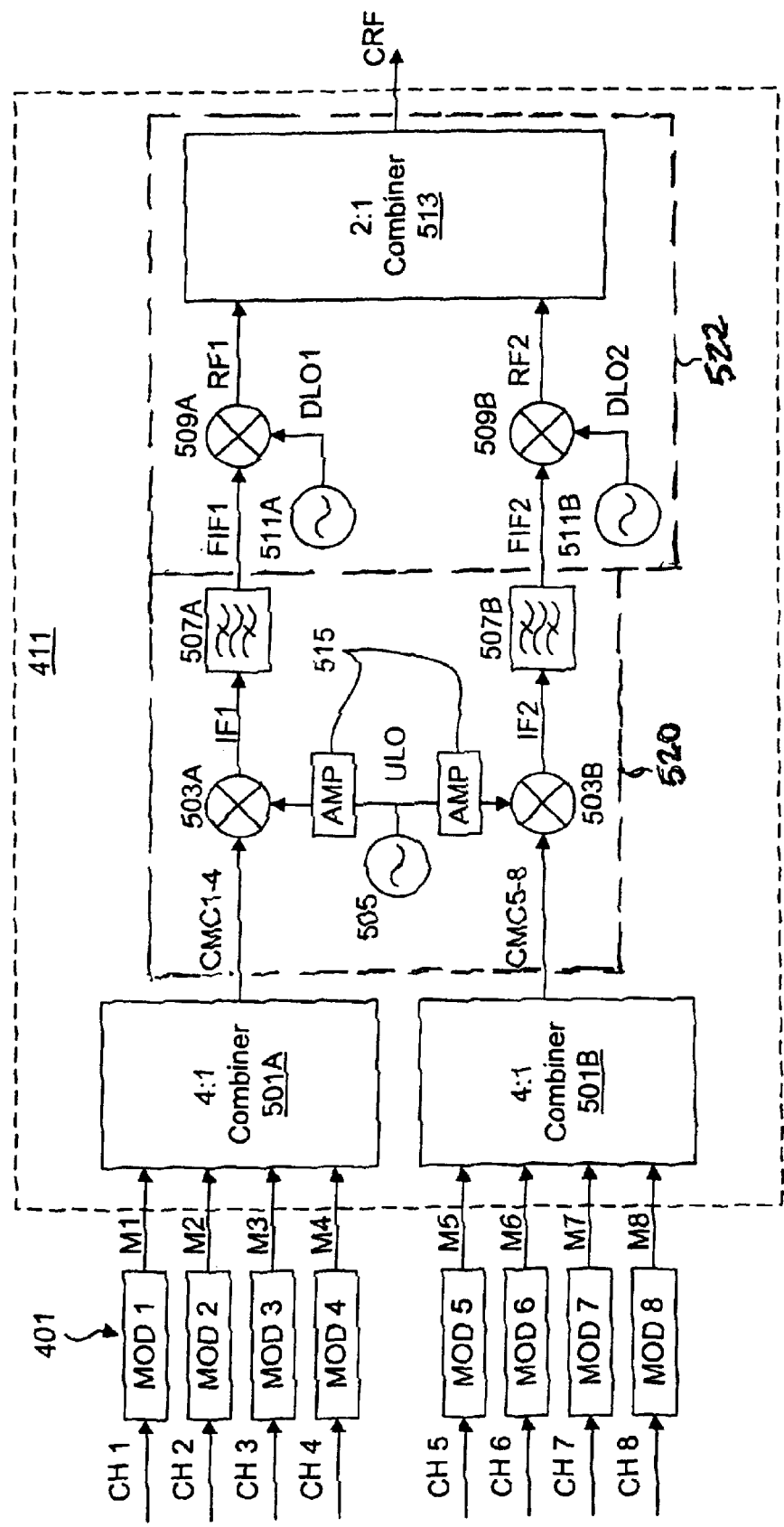
FIG. 5 is a block diagram of the RF transmitter network of FIG. 4 implemented according to an exemplary embodiment.

FIG. 5 is a block diagram of the RF transmitter network 411 implemented according to an exemplary embodiment coupled to selected ones of the modulators 401. In the illustrated embodiment, each of eight digital input channels, shown as CH 1–8, respectively, is provided to a corresponding one of eight separate modulators 401, individually shown as MOD 1–8, respectively. The modulators 401 assert a corresponding eight modulated digital signals M1–M8 to the RF transmitter network 411. The RF transmitter network 411 shown includes a first 4:1 combiner 501A that has inputs receiving the M1–M4 signals, and a second 4:1 combiner 501B that has inputs receiving the M5–M8 signals. The combiner 501A combines the modulated signals M1–M4 into a single combined modulated channel signal CMC1–4, which is provided to one input of an up-converter mixer 503A. The mixer 503A receives an output up-converter local oscillator (LO) signal, referred to as ULO, which is generated by an up-converter synthesizer 505 at another input, mixes the signals together and outputs an intermediate frequency (IF) signal IF1 at its output. The IF1 signal is provided an input of a bandwidth filter 507A, which outputs a corresponding filtered IF signal FIF1, which is provided to one input of a down-converter mixer 509A. The mixer 509A has another input that receives a down-converter local oscillator signal DLO1 generated by a down-converter synthesizer 511A, where the mixer 509A mixes the signals together and outputs a radio frequency signal RF1.

In a similar manner, the combiner 501B combines the modulated signals M5–M8 into a single combined modulated channel signal CMC5–8, which is provided to the input of another up-converter mixer 503B. The mixer 503B receives the ULO signal generated by the synthesizer 505 at another input, mixes the signals together and outputs another intermediate frequency signal IF2 at its output. The IF2 signal is provided an input of another bandwidth filter 507B, which outputs and provides a corresponding filtered IF signal FIF2 to one input of another down-converter mixer 509B. The mixer 509B has another input that receives another down-converter local oscillator signal DLO2 generated by another down-converter synthesizer 511B. The mixer 509B mixes the FIF2 and DLO2 signals together and outputs a radio frequency signal RF2.

The radio frequency signals RF1 and RF2 are provided to respective inputs of a 2:1 combiner 513, which combines the signals into a single combined RF signal CRF asserted via a corresponding transmitter RF link as previously described. The bandwidth filters 507A and 507B are also referred to as image reject filters used to isolate and forward a selected sideband image of the mixed signal and filter out the LO signal and any other undesired images. In one embodiment, the bandwidth filters 507A and 507B are centered around the difference between the center frequencies of the respective CMC 1–4 or CMC5–8 signals and the ULO signal (e.g., ULO—CMC1–4 or ULO—CMC5–8). The combiner 513 shown is a 2:1 combiner since it combines the two radio frequency signals RF 1 and RF2 into the CRF signal. It is noted that although only two RF signals are shown, the combiner 513 or any other suitable combiner may be employed to combine any appropriate number of RFX signals depending upon the needs of the particular configuration, where "X" is an integer number denoting the respective radio frequency signals. In the embodiment shown, as further described below, the frequencies of the ULO and DLOX signals are selected so that further filtering of the RFX signals is rendered unnecessary. For example, the frequency of the DLOX signals are sufficiently high, and the difference between each DLOX signal and the ULO signal is sufficiently large, so that isolation of the carrier and positive image frequencies is unnecessary. Of course, further filtering is contemplated if necessary in particular configurations.

The down-converter synthesizers 511 may each be implemented in a similar manner. Further, each synthesizer 511 is configured to operate at a different frequency relative to the other synthesizers so that the radio frequency signals RFX are sufficiently separated to avoid interference with each other. In one embodiment, each synthesizer 511 is adjustable, such as using a tunable oscillator or the like, so that the frequency of each DLOX signal may be adjusted to locate the corresponding RFX signal to be within any available frequency range within the overall frequency spectrum to provide frequency agility. It is appreciated that each radio frequency signal RFX incorporates multiple consecutive channels forming a block of channels, so that frequency adjustment of each DLOX signal moves a corresponding block of channels (RFX) up or down in the frequency spectrum. In addition or in the alternative, each of the synthesizers 511 are separated by a predetermined frequency offset. The frequency offset is selected to prevent interference or overlap of the block of channel signals with the RFX signals. Adjustable synthesizers provide frequency agility so that each RFX signal may be tuned as desired into an available frequency range. The frequency adjustment may be continuous, so that any possible frequency range may be utilized for each synthesizer 511, or discrete, in which adjustment is made among a plurality of predetermined block channel frequencies separated by an appropriate frequency offset.

It is noted that the configuration of the RF transmitter network 411 shown in FIG. 5 is exemplary only and that many variations are possible and contemplated. Although eight channels and corresponding modulators are shown, it is appreciated that any number of channels are contemplated for processing. Also, any appropriate number of combiners may be employed, where each combiner 501 may be implemented to handle any number of channels. Each combiner may handle as little as two channels apiece or a single combiner may be used for all channels depending upon the number of channels and capabilities of the applicable combiner. Any number of up-converter mixers 503 are contemplated, one for each channel combiner provided. Although a single synthesizer 505 is shown, it is contemplated that a separate up-converter synthesizer may be provided for each up-converter mixer 503. Optional amplifiers may be provided to amplify the ULO signal to properly drive the inputs of each of the up-converter mixers, if necessary. In the embodiment shown, two amplifiers 515 are illustrated to drive the ULO signal to the mixers 503A, 503B. As many amplifiers 515 as necessary may be provided. The use of a reduced number of synthesizers, or even a single up-converter synthesizer, enhances the efficiency of the overall system by correspondingly increasing the ratio of the number of channels processed per synthesizer. Further, the use of a single up-converter synthesizer, or multiple synthesizers providing ULO signals of approximately the same frequency, results in the IF signals having approximately the same frequency range. In this case, the bandwidth filters 507 may each be the same or otherwise configured to filter approximately the same frequency range, thereby further enhancing overall system efficiency.

In more specific embodiments, each of the modulators 401 assert digital output signals to the respective combiners 501A and 501B. Each combiner 501 combines the digital modulated signals into a combined digital signal and includes an internal digital to analog converter (DAC), (not shown), which converts the combined digital signal into a corresponding analog signal. For example, each modulator 401 may be a Quadrature digital up-converter employing QAM modulation techniques, such as the Analog Devices 9856 or 9857 chips manufactured by Analog Devices, Inc. or similar chips such as those manufactured by Intersil Corporation, Broadcom Corporation, etc. As described previously, however, alternative modulation techniques, such as FSK or QPSK, for example, or even un-modulated channels are contemplated. Each combiner 501 may be any appropriate type of combiner such as those provided by Mini-Circuits Laboratories or M/A-COM, Inc. In this manner, the CMC1–4 and CMC5–8 signals are analog signals provided to the corresponding mixers 503A, 503B, respectively. The remaining components including the combiner 513 operate with analog signals in the embodiment shown given the operable frequency ranges. It is noted that pure digital systems employing block conversion techniques are contemplated for lower frequency applications and/or for future high frequency applications using improved digital processing techniques.

Each of the modulated channel signals M1–8 are separated by a predetermined channel frequency. In one embodiment, each channel signal is approximately 6 MHz wide, which mirrors typical cable television channels. For example, in one embodiment it is contemplated that the modulated channel signals M1–M8 are centered at 15, 21, 27, 33, 39, 45, 51, and 57 MHz, respectively. In the digital domain, however, the sampling rate and frequency limitations of the combiners 501A and 501B may dictate lower frequency ranges and/or a smaller overall bandwidth. In an alternative embodiment, each of the combiners 501 may handle the same frequencies and frequency ranges, such as, for example, center frequencies of 15, 21, 27 and 33 MHz for each of the modulated signal groups M1–M4 and M5–M8. In this manner, the modulators 401 associated with a given combiner 501 are separated in frequency, although the frequencies may be duplicated for each combiner 501.

For a channel separation of 6 MHz and four channels, each of the combined channel signals CMC1–4 and CMC5–8 have a bandwidth of approximately 24 MHz. A bandwidth of 24 MHz is particularly convenient since the bandwidth filters 507A, 507B may be implemented using readily available, off-the-shelf GSM (Global System for Mobile Communications) bandwidth filters commonly used in the cellular telephony industry, which are already implemented with an operative bandwidth of 24–25 MHz. The operative frequency range for GSM communications is between 800–1000 MHz, having particular and predetermined center frequencies. In one specific embodiment, GSM communications operate with an exemplary center frequency of 902.5 MHz and the frequency range of each of the CMC1–4 and CMC5–8 signals is 12–36 MHz (centered at 24 MHz). In this case, the synthesizer 505 asserts the ULO signal at approximately 926.5 MHz in order to center each of the IF1 and IF2 signals at the center frequency (902.5 MHz) of the filters 507A and 507B. The resulting FIF1 and FIF2 signals in this specific embodiment each have a frequency range of approximately 890.5–914.5 MHz. Another exemplary GSM center frequency is 947.5, in which case the synthesizer 505 asserts the ULO signal at approximately 971.5 MHz and in which the resulting FIF1 and FIF2 signals are in the frequency range of approximately 935.5–959.5 MHz. It is noted, however, that these are very specific embodiments associated with GSM communications and it is understood that any suitable center frequency and corresponding frequency ranges may be employed.

The frequency range of the DLOX signals are chosen to be sufficiently high so that the corresponding RFX signals need not be further filtered prior to combination by the combiner 513. In one embodiment, the DLOX signals are in the 1–2 GHz range, such as approximately 1.6 GHz in a specific embodiment. For 6 MHz channel widths and four channels per block, the frequencies of the DLOX signals are separated by at least 24 MHz, and preferably by 50 MHz to avoid interference or overlap of the block channel RF signals. For example, the frequencies of the DLOX signals may be selected among frequencies of 1.60 GHz, 1.65 GHz, 1.70 GHz, 1.75 GHz, etc. The synthesizers 511 may be configured to be adjustable within a selected frequency range in a continuous or discrete manner. In one embodiment, each of the synthesizers 511A, 511B has a phase noise spectrum of at least 95 dBc at 10 kilohertz (kHz) off-center, where "dBc" refers to decibels (dB) related to the carrier frequency.

Figure 6:
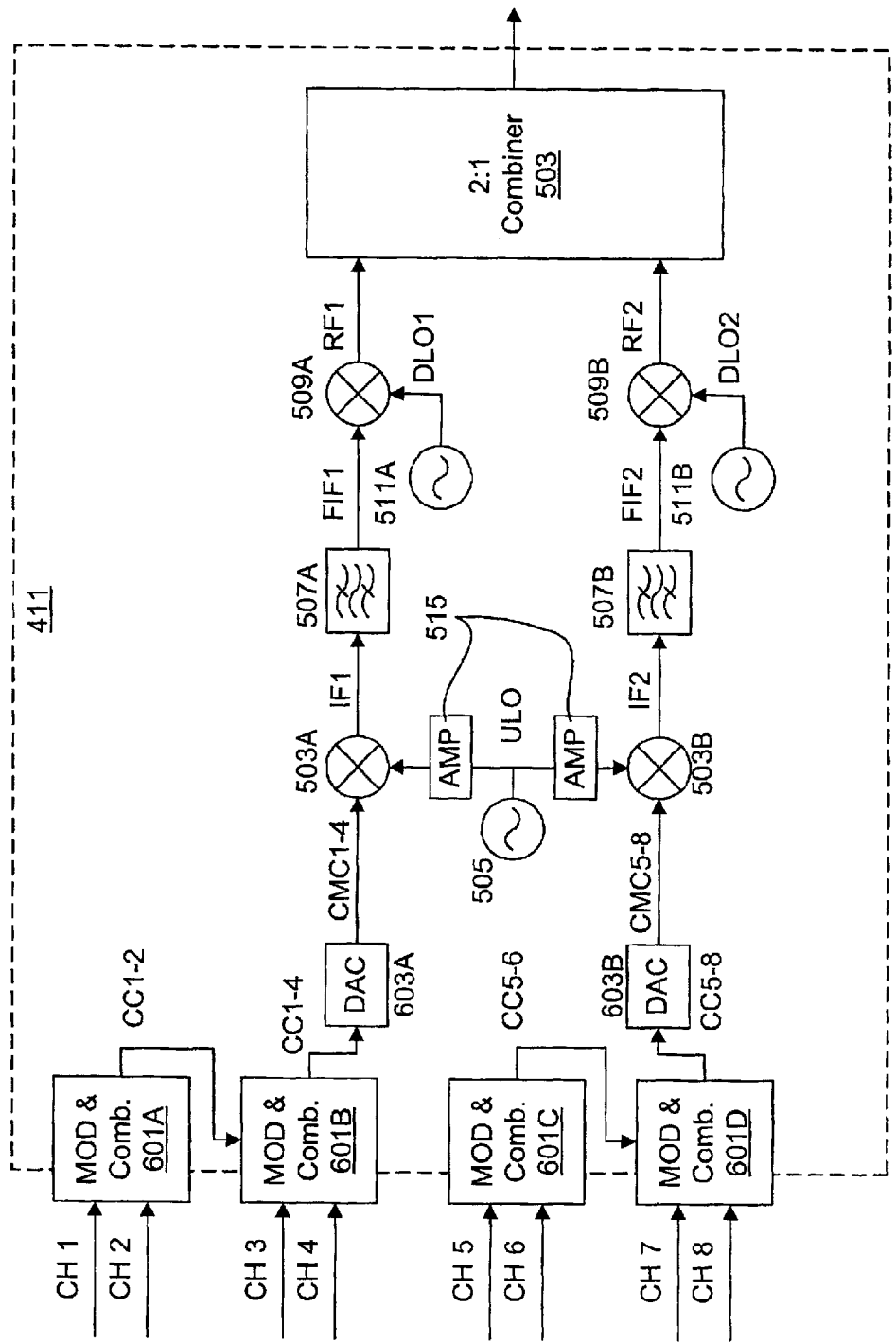
FIG. 6 is a block diagram of the RF transmitter network of FIG. 4 implemented according to another exemplary embodiment employing modulator and combiner units.

FIG. 6 is a block diagram of the RF transmitter network 411 implemented according to another exemplary embodiment. Similar components assume identical reference numerals in the Figures. In this configuration, the modulators 401 are incorporated into signal combiners at the front end. In the embodiment shown, four modulator (MOD) and combiner units 601A, 601B, 601C and 601D are employed to modulate and convert the two groups of four input channel signals CH 1–4 and CH 5–8 into combined channel signals CC1–4 and CC5–8, respectively. Each MOD and combiner unit 601A–D has at least two signal inputs, at least one summation/adder or combined signal input to receive a combined signal from another similar unit, and a combined signal output. In particular, the first MOD and combiner unit 601A combines the channel signals CH 1 and CH 2 into a combined channel signal CC1–2, which is provided to a combined signal input of the second combiner unit 601B. The second MOD and combiner unit 601B combines channel signals CH 3 and CH 4 with the combined channel signal CC1–2 into a single combined channel signal CC1–4. In a similar manner, the third MOD and combiner unit 601C combines channel signals CH 5 and CH 6 into a combined channel signal CC5–6, which is provided to a combined signal input of the fourth combiner unit 601D. The MOD and combiner unit 601D combines channel signals CH 7 and CH 8 with the combined channel signal CC5–6 into a single combined channel signal CC5–8. In one embodiment, the combined channel signals CC1–4 and CC5–8 are digital signals, so DACs 603A and 603B are employed to convert the digital signals CC1–4 and CC5–8 into the corresponding analog signals CMC1–4 and CMC5–8, respectively, which are then provided to the mixers 503A and 503B. The configuration and operation of the remaining components is the same or similar to that of FIG. 5 previously described.

The combiner units 601A–601D may be implemented by readily available and existing chips, such as, for example, the GC4116 Multi-Standard Quad DUC (Digital Up-Convert) chip manufactured by Graychip, Inc. (the "GC4116 chip") The GC4116 chip is normally employed in cellular communications and includes four signal serial input channels, a SUM input, and a SUM output. The SUM input and SUM output are multi-bit outputs for asserting parallel digital or binary signals. The SUM input is intended to receive a combined signal from another similar GC4116 chip for daisy-chain coupling and for combining multiple cellular input signals. The cellular input signals typically have a data rate on the order of approximately 200 kilobits per second (kbps). In contrast, the channel signals CH 1–8 may be in the MHz frequency range, such as between 10–100 MHz. Further, the channel signals CH 1–8 may be in complex form including separate in-phase (I) and quadrature phase (Q) signals. The GC4116 chip may be employed to combine two such complex channel signals by providing the I and Q signals of one channel to a respective two serial inputs and the I and Q signals of a second channel to the remaining two serial inputs. The SUM output is then combined with another two complex channels in a second chip daisy-chained to the first, thereby employing the SUM input resulting in a single digital signal incorporating four combined channel signals.

It is appreciated that the configurations of the RF transmitter network 411 shown in FIGS. 5 and 6 provide significant benefits as compared to prior configurations. One benefit is achieved by reducing the number of synthesizers necessary to perform the dual up-conversion and down-conversion process while still maintaining a sufficient degree of frequency agility. As demonstrated by the illustrated embodiments, the use of the front-end combiners 501 and/or 601 reduces the number of synthesizers from one per channel to at most one per combined channel signal. Thus, at least a 4:1 reduction is achieved in the first stage alone. A further reduction is achieved by duplicating the frequency ranges of the channel signals into each combiner, so that only one up-converter synthesizer is used for all channels. In the embodiment shown, this results in an 8:1 reduction at the front end alone. One or more amplifiers, significantly smaller and reduced power level devices, may be used to drive the LO signals into the up-converter mixers, if desired. The use of a single up-converter synthesizer or at least common up-converter LO signals enables simplification of the bank of filters 507. In one embodiment, each of the filters 507 are the same or at least operate in using the same frequency values. In lower frequency applications, a single filter may be shared using appropriate multiplexor circuitry. The reduction in the number of synthesizers concomitantly enables substantial reduction in the physical size and power requirements of the overall converter.

A further benefit is achieved at the down-converter portion in that the number of down-converter synthesizers is also reduced to one per combined channel signal. Frequency agility is maintained at the block level, in which the combined group of channels may be adjusted in frequency at the same time. Although frequency agility may not be as flexible as those systems that convert each channel individually since the block channels are adjusted together rather than on an individual basis, this does not pose a problem in most frequency schemes since sufficient spectrum is typically available. The savings achieved in physical size and power reduction significantly outweighs the possibility that a particular frequency scheme may not accommodate larger blocks of channels. Nonetheless, the size of the blocks may be reduced for one or more combiners for frequency schemes that would otherwise not accommodate a significant number of large channel blocks. In this manner, hybrid schemes are also contemplated in which the size of the channel blocks is variable, and further, individual channel RF signals may be combined with block channel RF signals in order to accommodate almost any type of frequency scheme. In this manner, the present invention provides substantial benefits for most frequency schemes of practical channelized communication systems.

Although various embodiments of the present invention have been described in detail, it should be understood that various changes, substitutions and alterations can be made hereto without departing from the spirit and scope of the invention as described by the appended claims.

What is claimed is:

1. A distributed block frequency converter for combining a plurality of channel signals into a combined RF signal, comprising:
   a plurality of combiners, each combining at least two of a plurality of channel signals into a corresponding one of a plurality of combined channel signals, wherein each of the plurality of combined channel signals are centered at approximately the same frequency value;
   an up-converter synthesizer that generates an up-converter local oscillator (LO) signal;
   a plurality of up-converter mixers, each mixing the up-converter LO signal with a corresponding one of the plurality of combined channel signals and providing a corresponding one of a plurality of intermediate frequency (IF) signals;
   a plurality of bandpass filters, each receiving a corresponding one of the plurality of IF signals and providing a corresponding one of a plurality of filtered signals;
   a plurality of down-converter synthesizers, each generating a corresponding one of a plurality of down-converter LO signals, the plurality of down-converter LO signals separate from each other in frequency;
   a plurality of down-converter mixers, each mixing a corresponding one of the plurality of down-converter LO signals with a corresponding one of the plurality of filtered signals and providing a corresponding one of a plurality of radio frequency (RF) signals; and
   a RF combiner that combines the plurality of RF signals into a combined RF signal.

2. The distributed block frequency converter of claim 1, further comprising:
   a plurality of up-converter synthesizers, each generating a corresponding one of a plurality of up-converter LO signals provided to a corresponding one of the plurality of up-converter mixers.

3. The distributed block frequency converter of claim 1, wherein each of the plurality of channel signals are modulated channel signals.

4. The distributed block frequency converter of claim 3, wherein at least one of the plurality of modulated channel signals is time division multiplexed incorporating data for a plurality of users.

5. The distributed block frequency converter of claim 1, wherein each of the plurality of combiners receives a subset of the plurality of channel signals, and wherein each channel signal of each subset of channel signals are separated in frequency by a predetermined frequency value.

6. The distributed block frequency converter of claim 1, wherein the plurality of combiners includes a first combiner that combines a first number of the plurality of channel signals and a second combiner combines a second number of the plurality of channel signals, wherein the first and second numbers are different.

7. The distributed block frequency converter of claim 1, wherein the first LO signal has a frequency such that when mixed with the plurality of combined channel signals by the plurality of up-converter mixers, the resulting plurality of IF signals are centered at a predetermined global system for mobile communications (GSM) frequency.

8. The distributed block frequency up-converter of claim 7, wherein the GSM frequency is between 800–1000 MHz.

9. The distributed block frequency converter of claim 7, wherein each of the plurality of bandpass filters are GSM filters.

10. The distributed block frequency converter of claim 9, wherein each of the plurality of channel signals are separated by a frequency of approximately 6 megahertz (MHz), wherein each of the plurality of combiners combines four channel signals into a corresponding combined channel signal having a bandwidth of approximately 24 MHz, and wherein each of the plurality of bandpass filters have an associated bandwidth of at least 24 MHz.

11. The distributed block frequency converter of claim 1, wherein the plurality of bandpass filters are image reject filters.

12. The distributed block frequency converter of claim 1, wherein each of the plurality of down-converter synthesizers are frequency adjustable.

13. The distributed block frequency up-converter of claim 1, wherein each of the plurality of channel signals are in digital format and wherein each of the plurality of combiners is a digital combiner.

14. The distributed block frequency converter of claim 13, further comprising:
a plurality of digital modulators, each modulating a stream of framed digital data of a corresponding channel into a corresponding modulated channel signal.

15. The distributed block frequency converter of claim 14, further comprising:
a plurality of modulator combiner units, each including digital modulators for modulating multiple channels and at least one of the plurality of combiners, and each combining the multiple channels into a combined channel signal.

16. The distributed block frequency converter of claim 15, wherein each modulator combiner unit further includes an adder that combines a combined channel signal from another modulator combiner unit with another combined channel signal to enable daisy chaining of the combiner units.

17. The distributed block frequency converter of claim 13, further comprising:
a plurality of digital to analog converters (DAC), each DAC converting a corresponding one of a plurality of combined channel signals from digital to analog format.

18. The distributed block frequency converter of claim 1, further comprising:
a plurality of modulators, each modulating a stream of framed digital data of a corresponding channel into a corresponding modulated analog channel signal.

19. The distributed block frequency converter of claim 18, wherein each of the plurality of modulators include an internal digital to analog converter (DAC).

20. The distributed block frequency converter of claim 18, wherein each of the plurality of combiners is an analog combiner.

21. A distributed block frequency converter for combining a plurality of channel signals into a combined RF signal, comprising:
an up-converter synthesizer that generates an up-converter local oscillator (LO) signal;
a plurality of up-converter mixers, each mixing the up-converter LO signal with a corresponding one of the plurality of combined channel signals and providing a corresponding one of a plurality of intermediate frequency (IF) signals;
a plurality of bandpass filters, each receiving a corresponding one of the plurality of IF signals and providing a corresponding one of a plurality of filtered signals;
a plurality of down-converter synthesizers, each generating a corresponding one of a plurality of down-converter LO signals, the plurality of down-converter LO signals separate from each other in frequency;
a plurality of down-converter mixers, each mixing a corresponding one of the plurality of down-converter LO signals with a corresponding one of the plurality of filtered signals and providing a corresponding one of a plurality of radio frequency (RF) signals;
a RF combiner that combines the plurality of RF signals into a combined RF signal output at a lower frequency than the plurality of filtered signals;
wherein each of the plurality of combiners receives a subset of the plurality of channel signals, and wherein each channel signal of each subset of channel signals are separated in frequency by a predetermined frequency value; and
at least two of the subsets of channel signals comprise a same set of channel frequency values.

22. A distributed block frequency converter for combining a plurality of channel signals into a combined RF signal, comprising:
an up-converter synthesizer that generates an up-converter local oscillator (LO) signal;
a plurality of up-converter mixers, each mixing the up-converter LO signal with a corresponding one of the plurality of combined channel signals and providing a corresponding one of a plurality of intermediate frequency (IF) signals;
a plurality of bandpass filters, each receiving a corresponding one of the plurality of IF signals and providing a corresponding one of a plurality of filtered signals;
a plurality of down-converter synthesizers, each generating a corresponding one of a plurality of down-converter LO signals, the plurality of down-converter LO signals separate from each other in frequency;
a plurality of down-converter mixers, each mixing a corresponding one of the plurality of down-converter LO signals with a corresponding one of the plurality of filtered signals and providing a corresponding one of a plurality of radio frequency (RF) signals;
a RF combiner that combines the plurality of RF signals into a combined RF signal;
wherein each of the plurality of down-converter LO signals are separated by a predetermined block frequency value.

23. The distributed block frequency converter of claim 22, wherein the block frequency value is approximately 50 Megahertz (MHz).

24. The distributed block frequency converter of claim 23, wherein each of the plurality of down-converter synthesizers has a phase noise spectrum of at least 95 dB at 10 kHz off-center frequency.

25. A method of block combining a plurality of channel signals into a combined RF signal for transport, comprising:

combining each of a plurality of subsets of a plurality of channel signals into a corresponding one of a plurality of combined channel signals, each subset including at least two channel signals and including centering each of the combined channel signals at approximately the same frequency value;

mixing each of the plurality of combined channel signals with an up-converter local oscillator (LO) signal to provide a corresponding plurality of intermediate frequency (IF) signals;

bandpass filtering each of the plurality of IF signals into a corresponding plurality of filtered signals;

generating a plurality of down-converter LO signals separated from each other in frequency;

mixing each of the plurality of down-converter LO signals with a corresponding one of the plurality of filtered signals to provide a corresponding plurality of radio frequency (RF) signals; and combining the plurality of RF signals into a combined RF signal.

26. The method of claim 25, further comprising:

generating a plurality of an up-converter LO signals; and said mixing each of the plurality of combined channel signals with an up-converter LO signal comprising mixing each combined channel signal with a corresponding one of the plurality of an up-converter LO signals.

27. The method of claim 25, further comprising:

separating each channel signal of each subset of channel signals in frequency by a predetermined frequency value.

28. The method of claim 25, further comprising:

adjusting the frequency of each of the plurality of down-converter LO signals to locate each of the plurality of RF signals within an available frequency range.

29. The method of claim 28, wherein said adjusting comprises adjusting the frequency of each of the plurality of down-converter LO signals to reduce interference between the plurality of RF signals.

30. The method of claim 25, further comprising:

modulating each of the plurality of channel signals prior to said combining.

* * * * *